United States Patent
Yu et al.

(10) Patent No.: US 12,539,742 B2
(45) Date of Patent: Feb. 3, 2026

(54) VEHICLE WINDOW ASSEMBLY

(71) Applicant: FUYAO GLASS INDUSTRY GROUP CO., LTD., Fujian (CN)

(72) Inventors: Wenjuan Yu, Fujian (CN); Jinquan Zhang, Fujian (CN); Zhiwei Lin, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 429 days.

(21) Appl. No.: 18/209,226

(22) Filed: Jun. 13, 2023

(65) Prior Publication Data

US 2023/0322052 A1 Oct. 12, 2023

Related U.S. Application Data

(63) Continuation of application No. PCT/CN2021/132969, filed on Nov. 25, 2021.

(30) Foreign Application Priority Data

Dec. 15, 2020 (CN) .......................... 202011469133.5
Dec. 15, 2020 (CN) .......................... 202011472543.5

(51) Int. Cl.
*B60J 10/20* (2016.01)
*B60J 1/00* (2006.01)
*B60J 10/70* (2016.01)

(52) U.S. Cl.
CPC ................ *B60J 1/006* (2013.01); *B60J 10/20* (2016.02); *B60J 10/70* (2016.02)

(58) Field of Classification Search
CPC . B60J 10/20; B60J 10/23; B60J 10/233; B60J 10/2335; B60J 10/70; B60J 10/79;
(Continued)

(56) References Cited

U.S. PATENT DOCUMENTS

| 4,486,985 A | 12/1984 | Kagitani et al. |
| 4,861,540 A * | 8/1989 | Nieboer ................ B60J 10/265 264/263 |

(Continued)

FOREIGN PATENT DOCUMENTS

| CN | 1935549 A | 3/2007 |
| CN | 102996021 A | 3/2013 |

(Continued)

OTHER PUBLICATIONS

Chinese First Office Action dated Dec. 22, 2021 issued in corresponding CN application No. 202011469133.5.
(Continued)

*Primary Examiner* — Gregory A Blankenship
(74) *Attorney, Agent, or Firm* — Scully, Scott, Murphy & Presser, P.C.

(57) ABSTRACT

A vehicle window assembly is provided. The vehicle window assembly includes a glass pane, an encapsulation fixed to an edge of the glass pane, a first insert mounted on the encapsulation, and a molding mounted on the first insert. The first insert is movably mounted on the encapsulation. An elastic portion is disposed at an abutting position of the first insert and a side wall of the encapsulation. The vehicle window assembly is configured to be mounted on a sheet metal. When the vehicle window assembly is mounted on the sheet metal, the side wall of the encapsulation faces the sheet metal. The elastic portion is pressed to generate a pre-tightening force that makes the first insert move towards the sheet metal, to drive the molding and make the molding be attached to the sheet metal.

18 Claims, 4 Drawing Sheets

(58) Field of Classification Search
CPC ..... B60J 10/30; B60J 10/36; B60J 1/02; B60J 1/04; B60J 1/004; B60J 1/005; B60J 1/006
See application file for complete search history.

(56) References Cited

U.S. PATENT DOCUMENTS

| | | | |
|---|---|---|---|
| 5,088,787 A | 2/1992 | Gross | |
| 5,118,157 A * | 6/1992 | Tamura | B60J 10/25 296/180.5 |
| 5,531,496 A * | 7/1996 | Zbinden | B60J 10/30 52/208 |
| 6,070,930 A * | 6/2000 | Takagi | B60J 10/70 296/84.1 |
| 6,086,138 A * | 7/2000 | Xu | B60J 1/10 52/204.591 |
| 2007/0056231 A1* | 3/2007 | DiMario | B60J 1/006 52/204.53 |
| 2007/0063539 A1* | 3/2007 | DiMario | B60J 1/006 248/216.4 |
| 2012/0056450 A1* | 3/2012 | DiMario | B60J 1/006 296/224 |
| 2014/0197663 A1* | 7/2014 | Takayama | B60J 1/006 156/108 |
| 2016/0325609 A1* | 11/2016 | Yu | B60J 10/45 |
| 2023/0023468 A1* | 1/2023 | Finkeldei | B60J 1/006 |
| 2023/0094469 A1* | 3/2023 | Snider | B60J 1/006 296/146.15 |
| 2023/0322052 A1* | 10/2023 | Yu | B60R 13/04 296/201 |
| 2024/0042834 A1* | 2/2024 | Bach | B60J 1/06 |
| 2024/0253438 A1* | 8/2024 | Lin | B60R 13/04 |

FOREIGN PATENT DOCUMENTS

| | | |
|---|---|---|
| CN | 103754170 A | 4/2014 |
| CN | 110293825 A | 10/2019 |
| CN | 209454857 U | 10/2019 |
| CN | 210617823 U | 5/2020 |
| CN | 111376844 A | 7/2020 |
| CN | 111746426 A | 10/2020 |
| CN | 211808991 U | 10/2020 |
| CN | 211809422 U | 10/2020 |
| DE | 3818603 A1 | 12/1989 |
| DE | 202014005240 U1 | 9/2014 |
| EP | 2110279 A2 | 10/2009 |
| EP | 2678177 A1 | 1/2014 |
| GB | 2435516 A | 8/2007 |
| WO | 2020126955 A1 | 6/2020 |

OTHER PUBLICATIONS

Chinese First Office Action dated Dec. 22, 2021 issued in corresponding CN application No. 202011472543.5.
International Search Report dated Feb. 7, 2022 issued in PCT/CN2021/132969.
Extended European Search Report dated Mar. 28, 2024 received in European Patent Application No. EP 21905474.9.

* cited by examiner

VEHICLE WINDOW ASSEMBLY

CROSS-REFERENCE TO RELATED APPLICATION(S)

This application is a continuation of International Application No. PCT/CN2021/132969, filed Nov. 25, 2021, which claims priority to Chinese Patent Application No. 202011469133.5, filed Dec. 15, 2020, and priority to Chinese Patent Application No. 202011472543.5, filed Dec. 15, 2020, the entire disclosures of which are hereby incorporated by reference.

TECHNICAL FIELD

This disclosure relates to the technology field of a mounting structure of a light molding of a vehicle window, and in particular to a vehicle window assembly.

BACKGROUND

At present, with development of vehicle technologies, consumers put forward higher requirements for aesthetics of vehicles. As a kind of vehicle decoration, a bright molding for the vehicle can improve the overall beauty of the vehicle and enhance a grade of the vehicle, which is widely used in middle and high-end vehicles.

At present, the bright molding for the vehicle is usually made of a metal or an alloy, is usually mounted through a special structure thereof or integrated on an encapsulation material at a periphery of an outer surface of a vehicle window by integral injection moulding, and plays a decorative and wind shielding role. The encapsulation material usually includes thermoplastic elastomer (TPE), polyvinyl chloride (PVC), ethylene propylene diene monomer (EPDM), etc., and a bright molding material mainly includes chrome-plated stainless steel and high-gloss plastic, which are exquisite and gorgeous in appearance and will not rust.

SUMMARY

A vehicle window assembly includes a glass pane, an encapsulation fixed to an edge of the glass pane, a first insert mounted on the encapsulation, and a molding mounted on the first insert. The first insert is movably mounted on the encapsulation. An elastic portion is disposed at an abutting position of the first insert and a side wall of the encapsulation. The vehicle window assembly is configured to be mounted on a sheet metal. When the vehicle window assembly is mounted on the sheet metal, the side wall of the encapsulation faces the sheet metal. The elastic portion is pressed to generate a pre-tightening force that makes the first insert move towards the sheet metal, to drive the molding and make the molding be attached to the sheet metal.

BRIEF DESCRIPTION OF THE DRAWINGS

In order to illustrate technical solutions in implementations of the present disclosure more clearly, accompany drawings required to be used in implementations of the present disclosure are described below.

REFERENCE SIGNS

1—glass pane, 2—encapsulation, 21—first lip, 3—first insert, 31—elastic portion, 32—second lip, 33—guide block, 34—snap-fit block, 35—hinge portion, 36—recess, 4—molding, 5—second insert, 51—X-directional guide rail, 52—Y-directional snap, 53—hinge shaft, 54—leg, 55—for-Y-directional branch portion, 56—X-directional branch portion, 6—sheet metal.

DETAILED DESCRIPTION

It should be noted that in description of the present disclosure, directional relationship or positional relationship indicated by terms such as "on", "under", and the like is directional relationship or positional relationship based on accompanying drawings and are only for the convenience of describing the present disclosure and simplifying the description, rather than explicitly or implicitly indicate that apparatuses or components referred to herein must have a certain direction or be configured or operated in a certain direction and therefore cannot be understood as limitation on the present disclosure. It should be noted that in the description of the present disclosure, unless specified and limited otherwise, terms "coupling", "connecting", and the like referred to herein should be understood in broader sense. For example, coupling may be a fixed coupling, a detachable coupling, or an integrated coupling, and may be a direct coupling, or an indirect coupling through an intermediary. In the description of the present disclosure, "glass" may be inorganic glass or plastic glass made of organic polymers or the like. For those of ordinary skill in the art, the above terms in the present disclosure can be understood according to specific situations.

After an existing molding is mounted on a vehicle window glass, a relative position of the existing molding and the vehicle window glass is fixed. Due to a manufacturing tolerance of an encapsulation structure of the vehicle window or a manufacturing tolerance of a sheet metal of a vehicle body, a position deviation exists between the encapsulation structure of the vehicle window and the sheet metal, thereby resulting in a gap between the molding and the sheet metal and a step between the molding and an encapsulation strip.

In the related art, the molding and the vehicle window glass are also separated into two parts, and then the two parts are individually mounted on the sheet metal of the vehicle body. In this way, although a tolerance matching problem can be solved to a certain extent, an additional mounting accessory is required for separately mounting the two parts, such that mounting costs are increased and a mounting process is complicated.

A technical problem to be solved by the present disclosure is the above technical problem existing in an existing vehicle window and an existing molding, and a vehicle window assembly with a self-adjusting molding is provided, and has a good appearance and can automatically adjust and compensate a tolerance.

A technical solution adopted by the present disclosure to solve the technical problem of the present disclosure includes the following. A vehicle window assembly includes a glass pane, an encapsulation fixed to an edge of the glass pane, a first insert mounted on the encapsulation, and a molding mounted on the first insert. The first insert is movably mounted on the encapsulation. An elastic portion is disposed at an abutting position of the first insert and a side wall of the encapsulation. The vehicle window assembly is configured to be mounted on a sheet metal. When the vehicle window assembly is mounted on the sheet metal, the side wall of the encapsulation faces the sheet metal. The elastic portion is pressed to generate a pre-tightening force that makes the first insert move towards the sheet metal, to drive the molding and make the molding be attached to the sheet metal.

In implementations, the encapsulation is provided with a second insert. The first insert is provided with a fitting portion in sliding fit with the second insert. The fitting portion is configured to make the first insert slide relative to the second insert. When the vehicle window assembly is mounted on the sheet metal, the side wall of the encapsulation faces the sheet metal. The elastic portion is pressed to generate the pre-tightening force that makes the first insert slide towards the sheet metal, to drive the molding and make the molding be attached to the sheet metal.

In implementations, the encapsulation is provided with a second insert. The first insert is provided with a hinge portion hinged with the second insert. The first insert is rotatably connected with the second insert through the hinge portion. When the vehicle window assembly is mounted on the sheet metal, the side wall of the encapsulation faces the sheet metal. The elastic portion is pressed to generate the pre-tightening force that makes the first insert rotate towards the sheet metal, to drive the molding and make the molding be attached to the sheet metal.

In implementations, the side wall of the encapsulation is configured to abut against the first insert through the second insert. The elastic portion is disposed at an abutting position of the first insert and the second insert. When the vehicle window assembly is mounted on the sheet metal, the second insert is configured to slide towards the first insert, to make the elastic portion abut against the first insert, to drive the first insert to slide towards the sheet metal to make the molding be attached to the sheet metal.

In implementations, the fitting portion includes a guide block. The second insert is provided with an X-directional guide rail. The X-directional guide rail is in sliding fit with the guide block in direction X. Direction X is parallel to an extending direction of the glass pane.

In implementations, the fitting portion further includes a snap-fit block. The second insert is provided with a Y-directional snap. The snap-fit block is snap-fitted with the Y-directional snap in direction Y to limit the first insert in direction Y. Direction Y is perpendicular to the extending direction of the glass pane.

In implementations, the Y-directional snap is implemented as two Y-directional snaps. The two Y-directional snaps are disposed at two opposite sides of the X-directional guide rail.

In implementations, the snap-fit block is in sliding fit with the Y-directional snap in direction X. The Y-directional snap is configured to limit the snap-fit block in direction X.

In implementations, during mounting the vehicle window assembly on the sheet metal, there is a freedom of a relative movement between the X-directional guide rail and the guide block in direction Y.

In implementations, the X-directional guide rail is a rectangular slot extending in direction X. The guide block is a guide protrusion in fit with the rectangular slot. When the vehicle window assembly is mounted on the sheet metal, the guide protrusion is snap-fitted with the rectangular slot and is slidable along the rectangular slot, to make a direction of the pre-tightening force generated by the elastic portion parallel to direction X and the first insert move towards the sheet metal, to drive the molding and make the molding be attached to the sheet metal.

In implementations, the fitting portion and the elastic portion are disposed at the same side of the glass pane, and are spaced apart from each other along an edge of the glass pane.

In implementations, the fitting portion is implemented as multiple fitting portions. The elastic portion is implemented as multiple elastic portions. The multiple fitting portions and the multiple elastic portions are alternatively arranged at intervals.

In implementations, the fitting portion has a height in direction Y higher than the elastic portion.

In implementations, the elastic portion is an arc-shaped bending portion. The arc-shaped bending portion and the first insert are of an integrated structure.

In implementations, the elastic portion is made of foam. The foam is bonded to one side of the first insert close to the second insert.

In implementations, the first insert is hinged with the second insert in direction Z. Direction Z is parallel to an extending direction of the encapsulation.

In implementations, the hinge portion defines a hinge hole. The second insert is provided with a hinge shaft matching the hinge hole. The hinge shaft is in fit with the hinge hole to make the first insert be rotatably connected with the second insert.

In implementations, the hinge portion is implemented as at least two hinge portions. The at least two hinge portions are spaced apart from each other at the same side of the glass pane and coaxially disposed.

In implementations, the hinge portion and the elastic portion are disposed at the same side of the glass pane and spaced apart from each other along an edge of the glass pane.

In implementations, the hinge portion is implemented as multiple hinge portions. The elastic portion is implemented as multiple elastic portions. The multiple hinge portions and the multiple elastic portions are alternatively arranged at intervals.

In implementations, the side wall of the encapsulation is configured to abut against the first insert through the second insert. The elastic portion is disposed at an abutting position of the first insert and the second insert. When the vehicle window assembly is mounted on the sheet metal, the second insert is configured to move towards the first insert, to make the elastic portion abut against the first insert, to drive the first insert to rotate towards the sheet metal to make the molding be attached to the sheet metal.

In implementations, the first insert defines a recess on an upper surface of the first insert. The recess is defined at an upper side of the hinge portion. The second insert is provided with a leg abutting against the recess. The recess has a length in direction Z longer than the leg. When the vehicle window assembly is mounted on the sheet metal, the upper surface of the first insert faces the glass pane. The upper side is a side of the first insert away from the glass pane. The length in direction Z is a length in a direction parallel to an extension direction of the encapsulation.

In implementations, the elastic portion is an arc-shaped bending portion. The arc-shaped bending portion and the leg of the second insert are of an integrated structure.

In implementations, the elastic portion is made of foam. The foam is bonded to part of the leg of the first insert close to the second insert.

In implementations, the second insert includes a Y-directional branch portion opposite to the edge of the glass pane and an X-directional branch portion opposite to an upper surface of the glass pane. The second insert has a hinge shaft. The hinge shaft has an axis-center height exceeding the upper surface of the glass pane.

In implementations, the molding is snap-fitted with and fixed to the first insert.

In implementations, the molding is detachably connected with the first insert.

In implementations, the molding is disposed between the encapsulation and the sheet metal. The encapsulation is provided with a first lip at one side of the encapsulation close to an upper surface of the glass pane. The molding has one end pressed on the sheet metal and another end pressed on the first lip of the encapsulation.

In implementations, the first insert is provided with a second lip at one end of the first insert facing the sheet metal. When the vehicle window assembly is mounted on the sheet metal, the second lip is disposed on a joint surface of the molding and the sheet metal.

By adopting the above technical solution, the present disclosure has following beneficial effects. In implementations of the present disclosure, the molding of the vehicle window assembly has a self-adjusting function, and can compensate a gap between the vehicle window assembly and the sheet metal and a step between the vehicle window assembly and the sheet metal structure due to the tolerance, such that an appearance surface is more beautiful. When the first insert of the vehicle window assembly is provided with the fitting portion in sliding fit with the second insert, there is no interference between the guide block, the snap-fit block, and the Y-directional snap. During mounting, it is only needs to be pressed in direction Y, and the mounting is quick and convenient. In a manner of Y-directional press, no distortion and no deformation occur, a structure is simple and compact, and an appearance surface of the encapsulation and an appearance surface of the molding are flatter. When the first insert of the vehicle window assembly is provided with the hinge portion hinged with the second insert, a Z-directional hinge structure is combined with a Z-directional inserting connection structure, such that the vehicle window assembly has a simple and compact structure, and the mounting is quick and convenient. By defining the recess, a positioning accuracy of Z-directional inserting connection is improved, especially when multiple hinge portions are arranged side by side, recesses can meet requirements of Z-directional rotation performance.

Contents of the present disclosure are further described below with reference to the accompanying drawings.

As illustrated in FIG. 1 to FIG. 8, a vehicle window assembly with a self-adjusting molding in the present disclosure includes a glass pane 1, an encapsulation 2 fixed to an edge of the glass pane 1, a first insert 3 mounted on the encapsulation 2, and a molding 4 mounted on the first insert 3. The first insert 3 is movably mounted on the encapsulation 2. An elastic portion 31 is disposed at abutting position of the first insert 3 and a side wall of the encapsulation. The vehicle window assembly is configured to be mounted on a sheet metal 6. When the vehicle window assembly is mounted on the sheet metal 6, the side wall of the encapsulation 2 faces the sheet metal 6. The elastic portion 31 is pressed to generate a pre-tightening force that makes the first insert 3 move towards the sheet metal 6, to drive the molding 4 and make the molding 4 be attached to the sheet metal 6.

In the present disclosure, when the vehicle window assembly is mounted on the sheet metal 6, the side wall of the encapsulation 2 faces the sheet metal 6, and the encapsulation 2 presses the elastic portion 31, such that the elastic portion 31 is pressed and deformed to drive the first insert 3 to move towards the sheet metal 6, to make the molding 4 be attached to the sheet metal 6. After the vehicle assembly is mounted, the elastic portion 31 is still in a compressed state, and the elastic portion 31 continues to press the first insert 3 under an action of a deformation restoring force, to generate the pre-tightening force that makes the first insert 3 move towards the sheet metal 6, such that molding 4 is attached to the sheet metal 6 closely. On condition that the encapsulation 2 or the sheet metal 6 of the window has a manufacturing tolerance, when the vehicle window assembly with the self-adjusting molding in the present disclosure is mounted on sheet metal 6, the molding 4 can be automatically driven to be attached to the sheet metal 6 under an adjustment of the elastic portion, so as to avoid a gap between the molding 4 and the sheet metal 6.

As illustrated in FIG. 1, and FIG. 3 to FIG. 6, in some implementations, a vehicle window assembly with a self-adjusting molding in the present disclosure includes a glass pane 1, an encapsulation 2 fixed to an edge of the glass pane 1, a first insert 3 mounted on the encapsulation 2, and a molding 4 mounted on the first insert 3. The first insert 3 is slidably mounted on the encapsulation 2. An elastic portion 31 is disposed at an abutting position of the first insert 3 and a side wall of the encapsulation 2. When the vehicle window assembly is mounted on the sheet metal 6, the side wall of the encapsulation 2 faces the sheet metal 6. The elastic portion 31 is pressed to generate a pre-tightening force that makes the first insert 3 slide towards the sheet metal 6, to drive the molding 4 and make the molding 4 be attached to the sheet metal 6. When the vehicle window assembly is mounted on the sheet metal 6, an elastic potential energy of the elastic portion 31 deformed, with a releasing tendency, is transformed into the pre-tightening force that makes the first insert 3 slide towards the sheet metal 6, to make the first insert 3 drive the molding 4 to be attached to the sheet metal 6. On condition that the encapsulation 2 or the sheet metal 6 of the vehicle window has a manufacturing tolerance, when the vehicle window assembly with the self-adjusting molding in the present disclosure is mounted on the sheet metal 6, the molding 4 can be automatically driven to be attached to the sheet metal 6 under an adjustment of the elastic portion 31, so as to avoid a gap between the molding 4 and the sheet metal 6.

Figure 2:
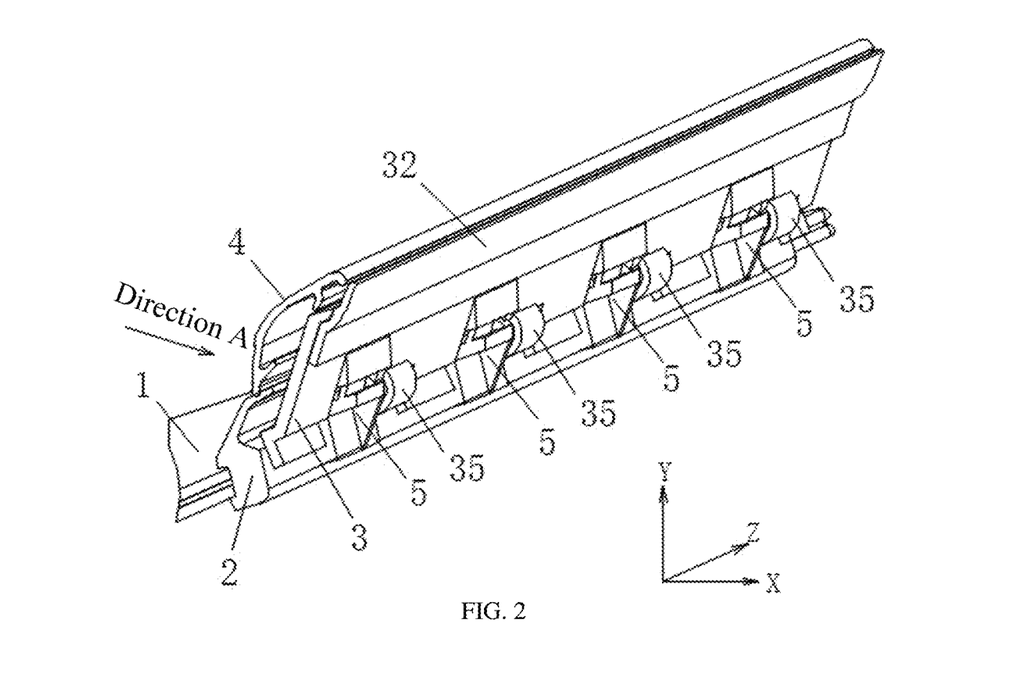
FIG. 2 is a schematic structural view of a vehicle window assembly of which a molding has a self-adjusting manner that is a rotating-shaft type, according to implementations of the present disclosure.
Figure 3:
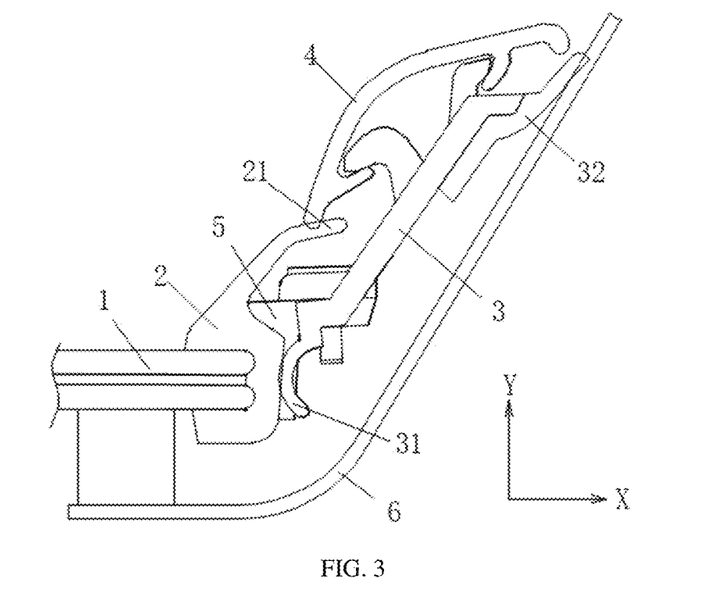
FIG. 3 is a front view illustrating cooperation of a sheet metal and the vehicle window assembly in FIG. 1.
Figure 4:
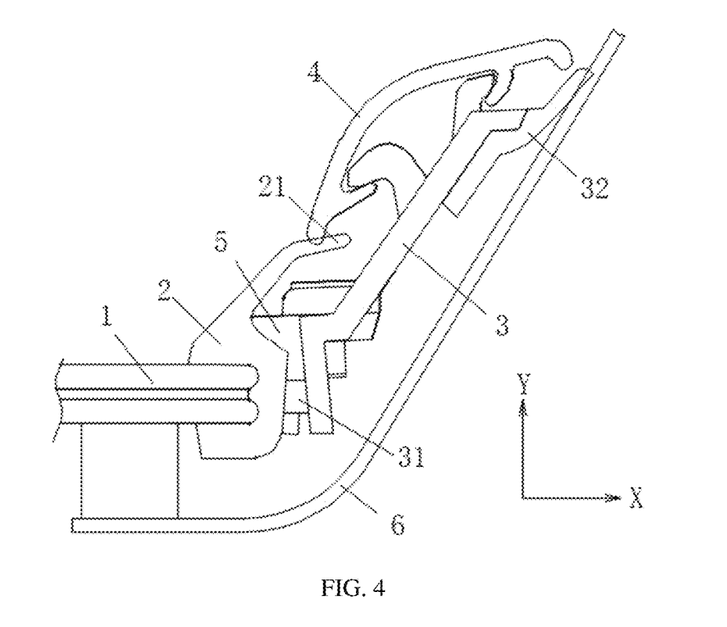
FIG. 4 is a front view illustrating cooperation of a sheet metal and a vehicle window assembly of which a molding has a self-adjusting manner that is a sliding type, according to other implementations of the present disclosure.
Figure 7:
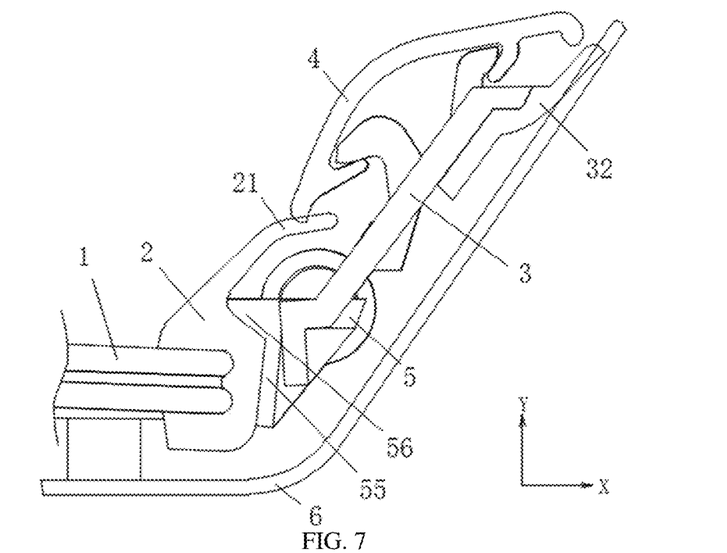
FIG. 7 is a front view illustrating cooperation of a sheet metal and the vehicle window assembly in FIG. 2.
Figure 8:
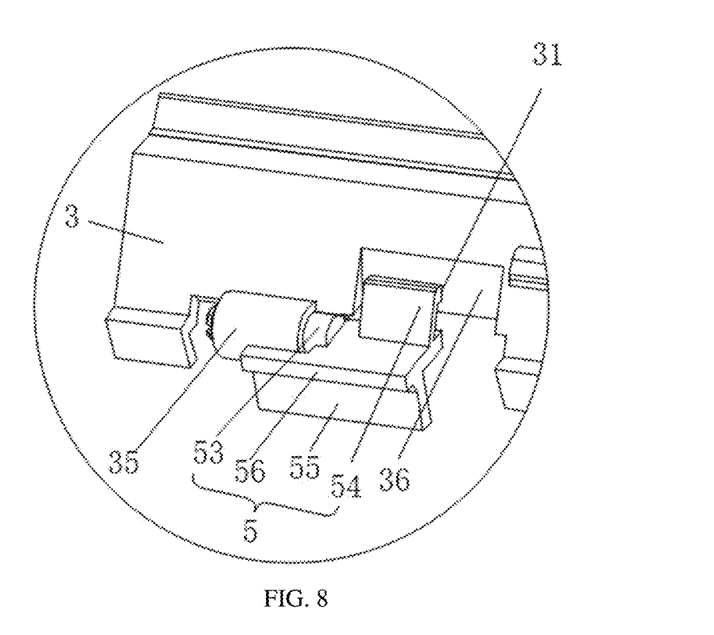
FIG. 8 is a partially enlarged view of FIG. 2 from a perspective of direction A, with some components omitted.

As illustrated in FIG. 2, FIG. 7, and FIG. 8, in some implementations, a vehicle window assembly with a self-adjusting molding in the present disclosure includes a glass pane 1, an encapsulation 2 fixed to an edge of the glass pane 1, a first insert 3 mounted on the encapsulation 2, and a molding 4 mounted on the first insert 3. The first insert 3 is rotatably mounted on the encapsulation 2 in direction Z, i.e., a Z-axis direction. An elastic portion 31 is disposed at an abutting position of the first insert 3 and a side wall of the encapsulation 2. When the vehicle window assembly is mounted on the sheet metal 6, for example, when the vehicle window assembly is bonded and fixed to the sheet metal by a polyurethane (PU) adhesive, the side wall of the encapsulation 2 faces the sheet metal 6. The elastic portion 31 is pressed to generate a pre-tightening force that makes the first insert 3 rotate towards the sheet metal 6, to drive the molding 4 and make the molding 4 be attached to the sheet metal 6. When the vehicle window assembly is mounted on the sheet metal 6, an elastic potential energy of the elastic portion 31 deformed is released in a tendency, to transform into the pre-tightening force that makes the first insert 3 rotate towards the sheet metal 6, to make the first insert 3 drive the molding 4 to be attached to the sheet metal 6. On condition that the encapsulation 2 or the sheet metal 6 of the window has a manufacturing tolerance, when the vehicle window assembly with the self-adjusting molding in the present disclosure is mounted on the sheet metal 6, the molding 4 can be automatically driven to be attached to the sheet metal 6 under an adjustment of the elastic portion 31, so as to avoid a gap between the molding 4 and the sheet metal 6.

Figure 1:
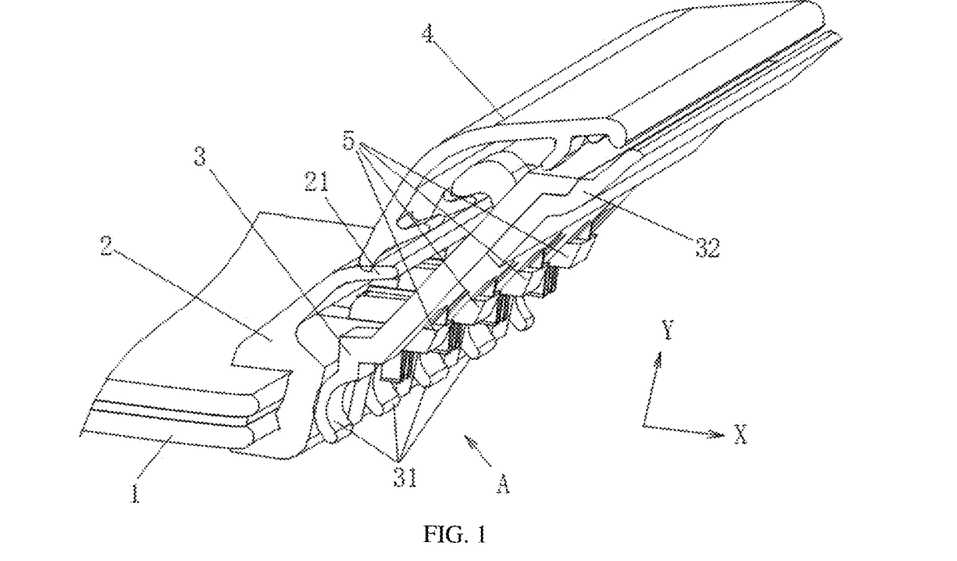
FIG. 1 is a schematic structural view of a vehicle window assembly of which a molding has a self-adjusting manner that is a sliding type, according to implementations of the present disclosure.

A XZ plane in FIG. 1 is a plane on which the glass pane is disposed. The edge of the glass pane 1 substantially follows the Z-axis direction, the encapsulation 2 is arranged along the edge of the glass pane 1, and an extending direction of the encapsulation 2 also substantially follows the Z-axis direction. Direction Z is parallel to an extending direction of the encapsulation 2. Direction X is parallel to an extending direction of the glass pane 1.

In the present disclosure, an encapsulation strip is fixed to an edge of a glass sheet by 3M bonding, PU bonding, local injection moulding, etc. The encapsulation strip may be made of PU, thermoplastic elastomer (TPE), ethylene propylene diene monomer (EPDM), polyvinyl chloride (PVC), polypropylene (PP), and other commonly used encapsulation materials for vehicle glass.

The "elastic portion" disposed at the abutting position of the first insert and the encapsulation may be integrated with the first insert, be integrated with the encapsulation, or be disposed on the first insert or the encapsulation through post-bonding, etc. In addition, it should be noted that the "elastic portion" may realize elasticity by adopting an elastic structure such as an arc-shaped bending portion thereof; or realize the elasticity by additionally using an elastic material such as a spring, or bonded foam, etc.

In some implementations, the encapsulation 2 is provided with a second insert 5. The first insert 3 is provided with a fitting portion in sliding fit with the second insert 5. The fitting portion is configured to make the first insert 3 to slide relative to the second insert 5. When the vehicle window assembly is mounted on the sheet metal 6, the side wall of the encapsulation 2 faces the sheet metal 6. The elastic portion 31 is pressed to generate the pre-tightening force that makes the first insert 3 slide towards the sheet metal 6, to drive the molding 4 and make the molding 4 be attached to the sheet metal 6. By disposing the second insert 5, a local strength of the encapsulation 2 can be improved, and the second insert 5 is in sliding fit with the first insert 3, such that the first insert 3 can be slidably mounted on the encapsulation 2.

In some implementations, the encapsulation 2 is provided with a second insert 5. The first insert 3 is provided with a hinge portion 35 hinged with the second insert 5. The first insert 3 is rotatably connected with the second insert 5 through the hinge portion 35. When the vehicle window assembly is mounted on the sheet metal 6, the side wall of the encapsulation 2 faces the sheet metal 6. The elastic portion 31 is pressed to generate the pre-tightening force that makes the first insert 3 rotate towards the sheet metal 6, to drive the molding 4 and make the molding 4 be attached to the sheet metal 6. By disposing the second insert 5, the local strength of the encapsulation 2 can be improved, and the second insert 5 is in rotating fit with the first insert 3, such that the first insert 3 is rotatably mounted on the encapsulation 2. A Z-directional rotating structure is combined with a Z-directional inserting connection structure, such that the molding 4 is integrated with the encapsulation 2 of the vehicle glass, and an assembly process is very quick and convenient, with good accuracy and stability. Then, the vehicle window assembly integrated with the molding is supplied to an original equipment manufacturer (OEM), thereby simplifying a mounting process on the whole vehicle mounting line.

Figure 5:
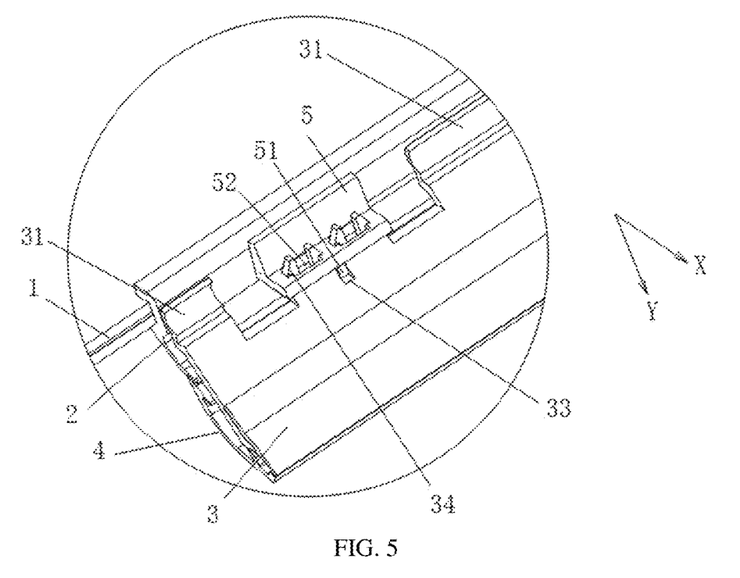
FIG. 5 is an enlarged schematic view of a fitting portion in FIG. 1 from a perspective of direction A.
Figure 6:
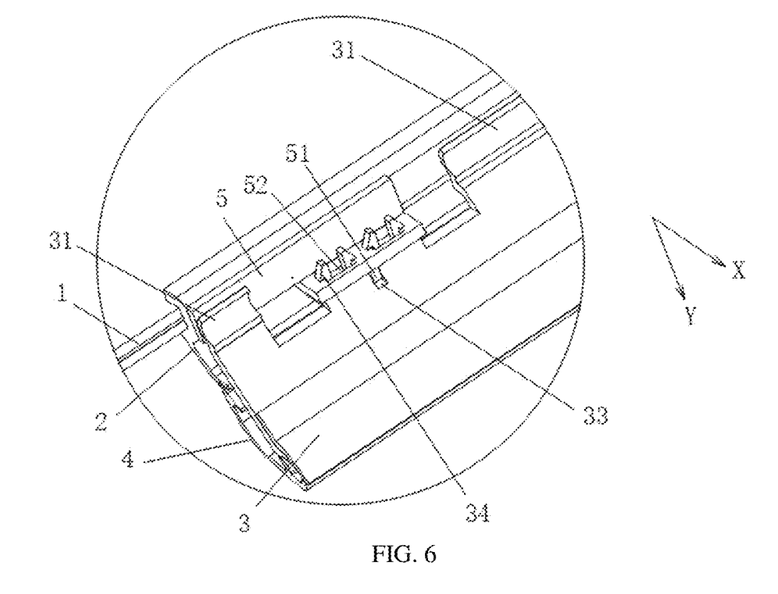
FIG. 6 is an enlarged schematic view of a fitting portion of a vehicle window assembly of which a molding has a self-adjusting manner that is a sliding type, according to other implementations of the present disclosure.

It should be understood that abutting of the first insert 3 and the encapsulation 2 is realized through the elastic portion 31. As illustrated in FIG. 5, the abutting may be a direct contact between the first insert 3 and the encapsulation 2. As illustrated in FIG. 6, the abutting may also be an indirect contact between the first insert 3 and the encapsulation 2 through an intermediary, the side wall of the encapsulation 2 is configured to abut against the first insert 3 through the second insert 5, and the elastic portion 31 is disposed at an abutting position of the first insert 3 and the second insert 5. It should be understood that the elastic portion 31 is an arc-shaped bending portion and integrated with the first insert 3. In other words, the arc-shaped bending portion and the first insert 3 are of an integrated structure. Foam bonded and fixed to the first insert 3 may also be adopted as the elastic portion 31. In other words, the first insert 3 is made of foam, and the foam is bonded to one side of the first insert 3 close to the second insert 5. As illustrated in FIG. 8, the side wall of the encapsulation 2 is configured to abut against the first insert 3 through the second insert 5. Here, the elastic portion 31 is disposed at the abutting position of the first insert 3 and the second insert 5. It should be understood that the elastic portion 31 may be the arc-shaped bending portion and integrated with the leg 54 of the second insert 5; or made of foam bonded to the leg 54 of the second insert 5.

In some implementations, during mounting the vehicle window assembly on the sheet metal 6, the molding 4 is mounted on the encapsulation 2 of the vehicle window first; then, the molding 4 fixed to the first insert 3 needs to be in a pre-tightening state in direction X, and after the first insert 3 is pre-tightened by pressing the elastic portion 31, the vehicle window assembly is mounted on the sheet metal 6 by the PU adhesive or the like. After the vehicle window assembly is mounted in place, the pre-tightening force of the elastic portion 31 is released, such that the first insert 3 is configured to move towards the sheet metal 6 and abut against the sheet metal 6. Due to the pre-tightening force, the molding 4 on the first insert 3 is closely attached to the sheet metal 6 to form a good appearance surface.

In some implementations, the first insert 3 in the vehicle window assembly is slidably connected with the encapsulation 2. Optionally, the side wall of the encapsulation 2 is configured to abut against the first insert 3 through the second insert 5. The elastic portion 31 is disposed at the abutting position of the first insert 3 and the second insert 5. When the vehicle window assembly is mounted on the sheet metal 6, the second insert 5 is configured slide towards the first insert 3, to make the elastic portion 31 abut against the first insert 3, to drive the first insert 3 to slide towards the sheet metal 6 to make the molding 4 be attached to the sheet metal 6. Specifically, the second insert 5 is configured to slide towards the first insert 3, the pre-tightening force generated by pressure of the elastic portion 31 makes the first insert 3 slide towards the sheet metal 6, and the first insert 3 drives the molding 4 to be attached to the sheet metal 6, such that the gap between the molding 4 and the sheet metal 6 is avoided.

Further, the fitting portion includes a guide block 33. The second insert 5 is provided with an X-directional guide rail 51. The X-directional guide rail 51 is in sliding fit with the guide block 33 in direction X. Direction X is parallel to an extending direction of the glass pane 1. In the present disclosure, a fitting structure of the X-directional guide rail 51 and the guide block 33 may be formed by fitting of a slot and a protrusion. For example, an X-directional guide rail in a slot form is in fit with a guide block in a protruding form, or an X-directional guide rail in a protruding form is in fit with a guide block in a slot form. The X-directional guide rail 51 is in fit with the guide block 33, such that a direction of the pre-tightening force generated by the pressure of the elastic portion 31 on the first insert 3 is limited to direction X.

Further, the fitting portion includes a snap-fit block 34. The second insert 5 is provided with a Y-directional snap 52. The snap-fit block 34 is snap-fitted with the Y-directional snap 52 in direction Y to limit the first insert 3 in direction Y. Direction Y is perpendicular to the extending direction of the glass pane 1. The snap-fit block 34 is snap-fitted with the Y-directional snap 52 in direction Y, such that the second insert 5 will not be separated from the first insert 3 in direction Y.

Optionally, the Y-directional snap 52 is implemented as two Y-directional snaps 52, and two Y-directional snap 52 are disposed at two opposite sides of the X-directional guide rail 51, such that a stability of the vehicle window assembly can be improved.

Optionally, the snap-fit block 34 is in sliding fit with the Y-directional snap 52 in direction X, and the Y-directional snap 52 is configured to limit the snap-fit block 34 in direction X, such that the second insert 5 will not be separated from the first insert 3 in direction X.

Further, the snap-fit block 34 is in sliding fit with the Y-directional snap 52 in direction X. After being mounted in place, as long as a Y-directional freedom of the X-directional guide rail 51 and the guide block 33 is limited, and there is a certain movement space in direction X, such that in a process that the first insert 3 drives the molding 4 to move in direction X to be attached to the sheet metal 6, a snap-fitting structure can always move in direction X without obstruction, thereby avoiding the appearance surface of the encapsulation 2 from being distorted and deformed.

Optionally, during mounting the vehicle window assembly on the sheet metal 6, there is a freedom of a relative movement between the X-directional guide rail 51 and the guide block 33.

Optionally, the X-directional guide rail 51 is a rectangular slot extending in direction X. The guide block 33 is a guide protrusion in fit with the rectangular slot. When the vehicle window assembly is mounted on the sheet metal 6, the guide protrusion is snap-fitted with the rectangular slot and is slidable along the rectangular slot, to make a direction of the pre-tightening force generated by the elastic portion 31 parallel to direction X and the first insert 3 move towards the sheet metal 6, to drive the molding 4 and make the molding 4 be attached to the sheet metal 6. In other words, during mounting the vehicle window assembly on the sheet metal 6, there is the freedom of the relative movement between the X-directional guide rail 51 and the guide block 33. For example, the X-directional guide rail 51 is set as the rectangular slot, and the guide block 33 is the guide protrusion that is in fit with the rectangular slot. For a conventional guide rail such as a dovetail slot, the conventional guide rail is only able to slide relative to the guide block and unable to be separated from the guide block in a direction perpendicular to a relative sliding direction. However, in the present disclosure, the X-direction guide rail 51 can be snap-fitted with or separated from the guide block 33 in direction Y due to a Y-directional non-limiting structure between the X-directional guide rail 51 and the guide block 33. During mounting the molding 4 on the encapsulation 2, as long as the snap-fit block 34 is directly inserted into the Y-directional snap 52 in direction Y, and the non-limiting structure between the X-directional guide rail 51 and the guide block 33 has a freedom, such that there is no movement interference in a mounting process, and the mounting process is very quick and convenient. After the molding is mounted in place, there is still no Y-directional limit on a contact surface between the X-directional guide rail 51 and the guide block 33, but the Y-directional limit is indirectly performed by the snap-fit block 34 and the Y-directional snap 52, so as to ensure that the insert is fixed to the encapsulation 2 and does not fall off.

In the present disclosure, by adopting a combination of an X-directional sliding fit structure and a Y-directional snap-fit structure, assembly can be directly realized in a manner of Y-directional insertion, such that the molding 4 is integrated with the encapsulation 2 of the vehicle window, which is very quick and convenient, and then supplied to the OEM, thereby simplifying the mounting process on the whole vehicle mounting line. In the meanwhile, the encapsulation 2 is arranged along the edge of the glass pane 1 in a substantially strip shape. Compared with other mounting manners, when the molding 4 is mounted on the encapsulation 2 in the manner of Y-directional inserting connection, the molding 4 is substantially vertically pressed on the encapsulation 2, especially an outer surface of a lip of the encapsulation, such that there is no tangential force between the encapsulation 2 and the molding 4, and the molding 4 and the encapsulation 2 are not prone to extrusion or distortion and deformation, and the molding 4 can be attached to the encapsulation 2 more closely.

Optionally, the fitting portion and the elastic portion 31 are disposed at the same side of the glass pane 1, and are spaced apart from each other along an edge of the glass pane 1.

Optionally, the fitting portion is implemented as multiple fitting portions. The elastic portion 31 is implemented as multiple elastic portions 31. The multiple fitting portions and the multiple elastic portions 31 are alternately arranged at intervals. In order to further reduce movement interference during mounting, the multiple fitting portions and the multiple elastic portions 31 are arranged side by side along the edge of the glass pane 1 and are arranged at intervals, such that the mounting process of the molding 4 and the encapsulation 2 of the vehicle window is quicker and more convenient. It is particularly beneficial to dispose the multiple fitting portions and the multiple elastic portions 31 at the edge of the glass pane 1, because when the multiple fitting portions and the multiple elastic portions 31 each are subject to a force in direction X, the encapsulation at the edge of the glass pane 1 has a relatively high strength and is not easily deformed by the force, such that stability of the multiple fitting portions and the multiple elastic portions 31 can be ensured. Optionally, the multiple fitting portions and the multiple elastic portions 31 are substantially disposed at the same straight line, and the multiple fitting portions and the multiple elastic portions 31 are alternately arranged at intervals.

Further, the fitting portion has a height in direction Y higher than the elastic portion 31. The height in direction Y is a distance in a direction perpendicular to the glass pane 1. During assembly, the elastic portion 31 in contact with the side wall of the encapsulation 2 first, so the elastic portion 31 can be pressed first, and then the fitting portion can be inserted into and mounted on the second insert 5 in direction Y, which can reduce interference and facilitate mounting.

In some implementations, the first insert 3 in the vehicle window assembly is rotatably connected with the encapsulation 2. Optionally, the encapsulation 2 is provided with a second insert 5, and the first insert 3 is provided with a hinge portion 35 hinged with the second insert 5. In other implementations, the first insert 3 is in inserting connection with the second insert 5 in direction Z, thereby realizing a hinge joint. In other words, the first insert 3 is hinged with the second insert 5 in direction Z. Direction Z is parallel to an extending direction of the encapsulation 2.

In a specific implementation, a hinge structure is illustrated in FIG. 8. The hinge portion 35 defines a hinge hole. The second insert 5 is provided with a hinge shaft 53 matching the hinge hole. The hinge shaft 53 is in fit with the hinge hole to make the first insert 3 be rotatably connected with the second insert 5.

Optionally, the hinge portion 35 is implemented as at least two hinge portions 35. The at least two hinge portions 35 are spaced apart from each other at the same side of the glass pane 1 and have axis centers coaxially disposed. In other words, the number of the hinge portions 35 is at least two, the at least two hinge portions 35 are spaced apart from each other at the same side of the glass pane 1 and coaxially disposed. The glass pane 1 has a certain radian, and the edge of the glass pane 1 is not a straight line, such that the hinge portion 35 may be implemented as multiple hinge portions 35 that are arranged side by side, and axis centers of the multiple hinge portions 35 are coaxial, which can not only ensure a strength of the hinge, but also easily ensure a coaxiality of the hinge. Compared with one-segment hinge structure, the multiple hinge portions 35 are disposed at an arc-shaped edge, such that the structure is more compact, the stability is good, and the mounting is more convenient.

Optionally, the hinge portion 35 and the elastic portion 31 are disposed at the same side of the glass pane 1 and are spaced apart from each other along an edge of the glass pane 1.

Optionally, the hinge portion 35 is implemented as multiple hinge portions 35. The elastic portion 31 is implemented as multiple elastic portions 31. The multiple hinge portions 35 and the multiple elastic portions 31 are alternatively arranged at intervals.

Optionally, the side wall of the encapsulation 2 is configured to abut against the first insert 3 through the second insert 5. The elastic portion 31 is disposed at an abutting position of the first insert 3 and the second insert 5. When the vehicle window assembly is mounted on the sheet metal 6, the second insert 5 is configured to move towards the first insert 3, to make the elastic portion 31 abut against the first insert 3, to drive the first insert 3 to rotate towards the sheet metal 6 to make the molding 4 be attached to the sheet metal 6.

Further, as illustrated in FIG. 8, the first insert 3 defines a recess 36 on an upper surface of the first insert 3. The recess 36 is defined at an upper side of the hinge portion 35. The recess 36 can be subject to a pressure by the second insert 5. The second insert 5 is provided with a leg 54 abutting against the recess 36. The recess 36 has a length in direction Z longer than the leg 54. When the vehicle window assembly is mounted on the sheet metal 6, the upper surface of the first insert 3 faces the glass pane 1. The upper side is a side of the first insert 3 away from the glass pane 1. The length in direction Z is a length in a direction parallel to an extension direction of the encapsulation 2. By setting a longer length in direction Z of the recess 36, a certain space in direction Z can be ensured for the leg 54 during inserting connection and mounting of the hinge portion 35 and the hinge shaft 53, such that no interference occurs during mounting, and the hinge shaft 53 is conveniently inserted into the hinge portion 35. In addition, after the hinge shaft 53 is inserted into and connected with the hinge portion 35 in place, the leg 54 can be attached to one side of the recess 36 to play a role Z-directional positioning, such that a positional accuracy of the mounting is ensured, which is particularly beneficial to realizing stability of Z-directional rotation, especially when the multiple hinge portions arranged side by side along the edge of the glass pane 1 are adopted. In other implementations, in order to further reduce movement interference and further improve a positioning accuracy, the hinge portion 35 and the recess 36 may be arranged in a staggered manner, and the hinge portion 35 and the recess 36 are arranged side by side along the edge of the glass pane 1 and spaced apart from each other. Optionally, the hinge portions 35 and the recesses 36 are substantially disposed at the same line, and the hinge portions 35 and the recesses 36 are alternately arranged.

Optionally, the elastic portion 31 is an arc-shaped bending portion. The arc-shaped bending portion and the leg 54 of the second insert 5 are of an integrated structure.

Optionally, the elastic portion 31 is made of foam. The foam is bonded to part of the leg 54 of the first insert 3 close to the second insert 5.

Further, the second insert 5 includes a Y-directional branch portion 55 opposite to the edge of the glass pane 1 and an X-directional branch portion 56 opposite to an upper surface of the glass pane 1. The second insert 5 has a hinge shaft 53. The hinge shaft 53 has an axis-center height exceeding the upper surface of the glass pane 1. The upper surface is a surface of the glass pane 1 close to the molding 4. A side of exceeding the upper surface is a side of the glass pane 1 closed to the molding 4. The Y-directional branch portion 55 extends in direction Y and is substantially disposed opposite and parallel to a side edge of the glass pane 1. The X-directional branch portion 56 extends in direction X and is substantially disposed opposite and parallel to the upper surface of the glass pane 1. During rotation of the molding 4 around direction Z, the second insert 5 and the encapsulation 2 adjacent to the second insert 5 are main force-bearing points. By adopting the above structural design, the hinge structure in the present disclosure not only has as little occupied space as possible, but also has as a high strength as possible, thereby realizing an elastic pre-tightening force sufficient to make the molding 4 be closely attached to the sheet metal 6 in a limited space between the vehicle window assembly and the sheet metal 6.

Optionally, the molding 4 is snap-fitted with and fixed to the first insert 3.

Optionally, the molding 4 is detachably connected with the first insert 3.

The molding 4 is disposed on the first insert 3 and is driven by the first insert 3 to be attached to the sheet metal 6 in a self-adjusting manner, such that the gap between the vehicle window assembly and the sheet metal 6 is avoided.

In some implementations, the molding 4 is disposed between the encapsulation 2 and the sheet metal 6. The encapsulation 2 is provided with a first lip 21 at one side of the encapsulation 2 close to an upper surface of the glass pane 1. The molding 4 has one end pressed on the sheet metal 6 and another end pressed on the first lip 21 of the encapsulation 2. When the vehicle window assembly is mounted on the sheet metal 6, the upper surface is a surface of the glass pane 1 close to the molding 4. In other words, when the vehicle window assembly is mounted on the sheet metal 6, the upper surface is a surface of the vehicle window assembly facing the outside of the vehicle, which can also be called an outer surface. The molding 4 is preferably assembled to the first insert 3 in a snap-fit manner, and the molding 4 is detachably connected with the first insert 3, such that the molding 4 can be ensured to be well pressed on a lip part of the encapsulation 2. The lip part is relatively soft, and the first lip 21 and the molding 4 are disposed to form a flexible fit, such that continuity of the appearance surface of molding 4 is ensured and the appearance is more beautiful.

Further, the first insert 3 is provided with a second lip 34 at one end of the first insert 3 facing the sheet metal 6. When the vehicle window assembly is mounted on the sheet metal, the second lip 34 is disposed on a joint surface of the molding 4 and the sheet metal 6. By disposing the second lip 34 between the molding 4 and the sheet metal 6, the molding 4 is attached to the sheet metal 6 more closely.

The above contents specifically describe the vehicle window assembly with the self-adjusting molding, but the present disclosure is not limited by the contents of specific implementations described above. Therefore, any improvements, equivalent modifications and replacements according to technical points of the present disclosure are within the scope of protection of the present disclosure.

What is claimed is:

1. A vehicle window assembly, comprising a glass pane, an encapsulation fixed to an edge of the glass pane, a first insert mounted on the encapsulation, and a molding mounted on the first insert, wherein the first insert is movably mounted on the encapsulation, an elastic portion is disposed at an abutting position of the first insert and a side wall of the encapsulation, the vehicle window assembly is configured to be mounted on a sheet metal, and when the vehicle window assembly is mounted on the sheet metal, the side wall of the encapsulation faces the sheet metal, and the elastic portion is pressed to generate a pre-tightening force that makes the first insert move towards the sheet metal, to drive the molding and make the molding be attached to the sheet metal;

wherein the encapsulation is provided with a second insert, the first insert is provided with a fitting portion in sliding fit with the second insert, the fitting portion is configured to make the first insert slide relative to the second insert, and when the vehicle window assembly is mounted on the sheet metal, the side wall of the encapsulation faces the sheet metal, and the elastic portion is pressed to generate the pre-tightening force that makes the first insert slide towards the sheet metal, to drive the molding and make the molding be attached to the sheet metal; or wherein the encapsulation is provided with the second insert, the first insert is provided with a hinge portion hinged with the second insert, the first insert is rotatably connected with the second insert through the hinge portion, and when the vehicle window assembly is mounted on the sheet metal, the side wall of the encapsulation faces the sheet metal, and the elastic portion is pressed to generate the pre-tightening force that makes the first insert rotate towards the sheet metal, to drive the molding and make the molding be attached to the sheet metal.

2. The vehicle window assembly of claim 1, wherein the side wall of the encapsulation is configured to abut against the first insert through the second insert, the elastic portion is disposed at an abutting position of the first insert and the second insert, and when the vehicle window assembly is mounted on the sheet metal, the second insert is configured to slide towards the first insert, to make the elastic portion abut against the first insert, to drive the first insert to slide towards the sheet metal to make the molding be attached to the sheet metal.

3. The vehicle window assembly of claim 1, wherein the fitting portion comprises a guide block, the second insert is provided with an X-directional guide rail, the X-directional guide rail is in sliding fit with the guide block in direction X, and direction X is parallel to an extending direction of the glass pane.

4. The vehicle window assembly of claim 3, wherein the fitting portion further comprises a snap-fit block, the second insert is provided with a Y-directional snap, and the snap-fit block is snap-fitted with the Y-directional snap in direction Y to limit the first insert in direction Y, wherein direction Y is perpendicular to the extending direction of the glass pane.

5. The vehicle window assembly of claim 4, wherein the snap-fit block is in sliding fit with the Y-directional snap in direction X, and the Y-directional snap is configured to limit the snap-fit block in direction X.

6. The vehicle window assembly of claim 4, wherein there is a freedom of a relative movement between the X-directional guide rail and the guide block in direction Y.

7. The vehicle window assembly of claim 6, wherein the X-directional guide rail is a rectangular slot extending in direction X, the guide block is a guide protrusion in fit with the rectangular slot, and when the vehicle window assembly is mounted on the sheet metal, the guide protrusion is snap-fitted with the rectangular slot and is slidable along the rectangular slot, to make a direction of the pre-tightening force generated by the elastic portion parallel to direction X and the first insert move towards the sheet metal, to drive the molding and make the molding be attached to the sheet metal.

8. The vehicle window assembly of claim 1, wherein the fitting portion has a height in direction Y higher than the elastic portion.

9. The vehicle window assembly of claim 1, wherein the elastic portion is an arc-shaped bending portion and the arc-shaped bending portion and the first insert are of an integrated structure, or the elastic portion is made of foam and the foam is bonded to one side of the first insert close to the second insert.

10. The vehicle window assembly of claim 1, wherein the first insert is hinged with the second insert in direction Z, and direction Z is parallel to an extending direction of the encapsulation.

11. The vehicle window assembly of claim 1, wherein the hinge portion defines a hinge hole, the second insert is provided with a hinge shaft matching the hinge hole, and the hinge shaft is in fit with the hinge hole to make the first insert be rotatably connected with the second insert.

12. The vehicle window assembly of claim 1, wherein the hinge portion is implemented as at least two hinge portions, and the at least two hinge portions are spaced apart from each other at the same side of the glass pane and coaxially disposed.

13. The vehicle window assembly of claim 1, wherein the side wall of the encapsulation is configured to abut against the first insert through the second insert, the elastic portion is disposed at an abutting position of the first insert and the second insert, and when the vehicle window assembly is mounted on the sheet metal, the second insert is configured to move towards the first insert, to make the elastic portion abut against the first insert, to drive the first insert to rotate towards the sheet metal to make the molding be attached to the sheet metal.

14. The vehicle window assembly of claim 13, wherein the first insert defines a recess on an upper surface of the first insert, the recess is defined at an upper side of the hinge portion, the second insert is provided with a leg abutting against the recess, the recess has a length in direction Z longer than the leg, and when the vehicle window assembly is mounted on the sheet metal, the upper surface of the first insert faces the glass pane, the upper side is a side of the first insert away from the glass pane, and the length in direction Z is a length in a direction parallel to an extension direction of the encapsulation.

15. The vehicle window assembly of claim 13, wherein the elastic portion is an arc-shaped bending portion and the arc-shaped bending portion and the leg of the second insert are of an integrated structure, or the elastic portion is made of foam and the foam is bonded to part of the leg of the first insert close to the second insert.

16. The vehicle window assembly of claim 1, wherein the second insert comprises a Y-directional branch portion opposite to the edge of the glass pane and an X-directional branch portion opposite to an upper surface of the glass pane, the second insert has a hinge shaft, and the hinge shaft has an axis-center height exceeding the upper surface of the glass pane.

17. The vehicle window assembly of claim 1, wherein the molding is snap-fitted with and fixed to the first insert.

18. The vehicle window assembly of claim 1, wherein the molding is disposed between the encapsulation and the sheet metal, the encapsulation is provided with a first lip at one side of the encapsulation close to an upper surface of the glass pane, and the molding has one end pressed on the sheet metal and another end pressed on the first lip of the encapsulation.

* * * * *